United States Patent Office 2,795,567
Patented June 11, 1957

2,795,567
CHEMICAL PRODUCT

Robert A. Ruehrwein, Dayton, Ohio, assignor to Monsanto Chemical Company, St. Louis, Mo., a corporation of Delaware No Drawing. Application April 14, 1953,
Serial No. 348,809

19 Claims. (Cl. 260—41)

This invention relates to products prepared by interaction of polymeric organic materials with certain solids. The invention in preferred aspects concerns adducts of polycations with inorganic solids that are gel-forming in water and/or have base exchange capacity, e. g. clays, silica gel, alumina.

It has long been known that clays and other inorganic solids having high surface area are capable of reacting with organic amines to form, presumably by base exchange reaction, adducts, which, unlike the initial hydrophilic inorganic solids, are hydrophobic. The reaction has been applied particularly to base exchange clays reacted with "onium" compounds. Expanding lattice clays, e. g. montmorillonite, have hydrophilic surfaces, partly by virtue of sodium or other hydratable cations located at the surfaces of the ultimate layers of the clay. By replacement of these inorganic cations with certain organic cations, the clay surface can be made hydrophobic rather than hydrophilic by covering of the surface with hydrophobic material, e. g. hydrocarbon chains. This type of reaction has, up to the present time, been applied only to organic compounds having comparatively low molecular weight. Although it has been recognized that a marked change from hydrophilic to hydrophobic occurs only when the number of carbon atoms in an amine reacted with the clay is at least 10 or 12, the molecular weight of amines and other onium compounds heretofore subjected to reaction with clays has not been very high. The reasons for the silence of the art with respect to higher molecular weight materials is unknown, but in any event it is apparent that the quantity of organic material that can become associated with the clay is thus limited, inasmuch as only one molecule of amine or other onium compound can be taken up by each available base exchange site on the clay. The art recognizes that cation exchange sites are present on the faces of the montmorillonite layers, and hence it is logical to believe that there is a definite limit to the size of the molecule that can be introduced by this mechanism without encountering effects of hindrance by first-introduced molecules.

It has heretofore been suggested that an unsaturated monomeric radical, e. g., allyl or acrylyl, can be associated with montmorillonite by base exchange or other means, such as use of lead acrylate, and the resulting material then subjected to polymerizing conditions. Of course it is understandable in view of the detailed knowledge available of the structure of montmorillonites, that a low molecular weight unsaturated material could thus be introduced to the clay, but subsequent polymerization would be expected to be of limited value because of difficulty in initiating polymerization, low conversion, and low molecular weight due to immobility of monomers. Also, the exchange capacity of the clay strictly limits the weight of monomer that can be used.

An object of the present invention is to provide a composition of matter containing both inorganic and organic substituents. Another object of the invention is to provide improved adducts of organic materials with inorganic solids having base exchange capacity. A further object of the invention is to provide a method for making clays and other gel-forming inorganic oxides hydrophobic. Another object is to make adducts of clay with organic materials having a high proportion of organic matter in the adduct. Yet another object of the invention is to prepare organo-clay adducts having good compatibility with polymers. Yet another object of the invention is to provide hydrophobic solids of light color. A further object is to provide organo-clay adducts the organic portion of which is highly stable towards heat and other decomposing influences. Further objects and advantages of the invention will be apparent to those skilled in the art from the accompanying disclosure and discussion.

In accordance with preferred aspects of the present invention, inorganic solids that are gel-forming in water and/or that possess ion exchange-like properties are reacted with cationic polymers containing a substantially linear carbon molecular chain derived by the polymerization of at least one monoolefinic compound through aliphatic unsaturation. These materials with which the inorganic solid is reacted are herein termed "polycations." These polycations are high polymers which in water undergo electrolytic dissociation to give a positively charged polymer. The polycations to be used preferably have a molecular weight at least 10,000, and molecular weights above 15,000 are usually preferred. The molecular weight of suitable polycations is often in the range of 50,000 to 100,000 and even higher. However, low molecular weight polycations can be used in some instances, for example those having a molecular weight of say 5000, or less preferably as low as 2000 or even lower. Molecular weights referred to herein are those determined by the light scattering method described by Debye, Journal of Physics and Colloid Chemistry, 51, 18 (1947). Molecular weights determined by the light scattering method are weight average molecular weights; see Zimm and Doty, Journal of Chemical Physics, 12, 203 (1944). In practicing this invention the polycations are believed to become bound to the surfaces of the clay or other solid by forces much greater than those binding lower molecular weight, e. g., monomeric, basic compounds to such surfaces.

Polycations with which the invention is principally concerned are those continuous carbon chain skeleton polymers having a plurality of recurring nitrogen-containing basic groups in the molecule such that upon dissolution or suspension in water the polymer becomes a positively charged molecule or particle.

The polycations are interacted with materials of the nature of hydrophilic substances that have base exchange capacity either in the sense of base exchange clays or which act in that manner many of which are also gel-forming in water. While the inorganic materials are preferred, organic base exchange materials, e. g., phenol-formaldehyde resin capable of cation exchange, can also be used for reaction with polycations in accordance with the present invention. Generally speaking a solid that undergoes an ion exchange type of reaction is used, commonly referred to as ion exchange-adsorbent materials. Among the materials that can be used are hydrophilic inorganic materials having a high surface area and capable of taking up polycations by an apparent chemical bond by virtue of base exchange reaction or a phenomenon which resembles base exchange reaction. Suitable hydrophilic inorganic materials include those forming a gel in water such as oxides (including hydroxides) of alkaline earth metals and polyvalent metals such as aluminum, iron, vanadium; certain phosphates, sulfides, and sulfates of heavy metals in gel form; silica, especially silica xerogels and aerogels. Artificial and natural aluminum silicates and modified aluminum silicates are particularly desirable, and those naturally occurring clays containing large proportions of montmorillonite and thus having high base exchange capacity are the preferred materials to which the present invention is applicable. Special note is made of bentonite, hectorite, beidellite, nontronite, saponite. However, other types of clays can also be used, e. g., kaolinite, attapulgite.

When a naturally occurring clay is to be used, it is preferred that it be from a deposit which is essentially pure clay, or that it be subjected to known purification treatments to free it from non-clay material and produce an essentially pure clay, e. g., a material which is at least 95 weight percent clay. A conventional treatment involves suspension of impure mined clay in water, settling of non-clay impurities (sand, silt, etc.) and a separation of the settled impurities from the clay suspension; such suspension can then be used directly for reaction with polycation or the clay can be separated and dried for later use in reacting with polycation.

The phenomenon of base exchange in expanding lattice clays can be briefly summarized as follows with reference to typical swelling bentonites. The predominant mineral in bentonite clays is montmorillonite, a hydrous aluminosilicate consisting essentially of gibbsite, a hydrated aluminum oxide, condensed between two layers of silica. The platelet so formed has a thickness of about 10 Angstrom units (A.) and variable lateral dimensions of an average value in the neighborhood of 2,000 A. Variable portions of the trivalent aluminum ions are replaced by divalent magnesium ions, or in other types of clays variable portions of silicon are replaced by aluminum, giving rise to a negative charge on the platelet. This negative charge is satisfied by cations present in or on the plate surfaces. In the naturally occurring clays, these cations are metallic cations such as sodium, calcium, etc. If this external ion is sodium as in Wyoming bentonite, the clay swells strongly in water, a result believed to be due partly to the large increase in volume of the sodium ion upon hydration and also to hydration of the surface of the plate. If the ion is hydrogen, or calcium or other polyvalent ion, the clays do not swell nearly so much in water, but are, however, considered a type of gel-forming solid for the purposes of this invention. The cation exchange capacity of bentonite or the like is given as the number of milliequivalents of exchangeable ions present in 100 grams of clay. Most clays have exchange capacities considerably below that theoretically possible due principally to the presence of impurities. Some 70 to 80 percent of the cation exchange sites are on the clay surfaces, and the balance on the edges. The c-axis spacing between clay layers is easily measured by standard techniques of X-ray diffraction.

The words "hydrophilic" and "hydrophobic" as used herein refer to the wettability and non-wettability of a substance by water. Considering for example kaolinite, it may be thought of in one sense as hydrophobic, since water does not penetrate throughout the molecule to form a solution, as water does with gelatin for instance. However, kaolinite is easily wet by water and tends to swell at least to a slight extent in water, so it is considered to be hydrophilic as the term is used herein. By the practice of the present invention hydrophilic substances are made hydrophobic, manifested by an increased resistance towards wetting by water.

I prefer to employ in the present invention hydrophilic solids of the nature discussed herein having an ion exchange capacity of at least 20 milliequivalents per 100 grams.

Cationic polymers that can be used in the practice of the present invention include homopolymers of vinylpyridines, e. g. 2-vinylpyridine, 4-vinylpyridine, 2-methyl-5-vinylpyridine, 2-vinyl-5-ethylpyridine; amino alkyl acrylates and methacrylates, e. g. dimethylaminoethylacrylate, β-aminoethylacrylate, dimethylaminoethylmethacrylate, dimethylaminobutylacrylate; vinylpiperidines; N,N-dimethylvinylamine; and others that will be mentioned herein. While the homopolymers of such materials are valuable in the practice of the invention, it is preferred to employ copolymers of same with other ethylenically unsaturated copolymerizable monomers, the latter preferably being non-basic. Said copolymers are advantageous, especially when containing at least 50 weight percent of a non-basic monomer polymerized therein, in that they permit the incorporation of very large quantities of organic material with the clay or other base exchange type solids. Copolymers containing down to as little as 5 weight percent basic monomer copolymerized with up to 95 weight percent non-basic monomer are useful in the present invention provided the particular copolymer has sufficient reactivity with the clay.

It is to be understood that when reference is made herein to polycations, or basic reacting polymers, or words of like import are used, any one of several different forms of such polymers is contemplated. Amino nitrogen-containing polymers are considered to be polycations, etc., whether the nitrogen is in the trivalent or the pentavalent form. A most usual form of polymer is the quaternary wherein a basic polymer for example a polyvinylpyridine or other polymer containing a trivalent amino nitrogen atom is reacted with any of the known quaternizing agents. Such quaternizing agents include the acids, e. g. hydrochloric, acetic, sulfuric, paratoluenesulfonic, etc. Other suitable quaternizing agents are the organic halides especially the alkyl halides, e. g. methyl chloride, butyl bromide, dodecyl bromide. Other quaternizing agents are the esters, e. g. methylparatoluenesulfonate, methylsulfate, ethyl nitrate, alkylsulfonate esters, phosphate esters, alkyl or aryl sulfonyl halides, etc. The quaternized polymers are polycations in the strictest sense, inasmuch as upon their dissolution in water, they give rise by electrolytic dissociation to positively-charged polymer molecules. They are reacted with a sodium bentonite or other solid of the nature described herein, by base exchange type of reaction. This can be represented diagrammatically in the case of polyvinylpyridine hydrochloride and sodium montmorillonite for example as shown in Equation 1 below, wherein the S represents a clay base exchange site, and P represents one pyridine group of a polyvinylpyridine. It will be appreciated that numerous quaternized pyridine groups may be present in a single polymer molecule and that numerous base exchange sites will be present in a single montmorillonite platelet.

$$PH^+Cl^- + S^-Na^+ \rightarrow SPH + Na^+Cl^- \quad (Eq.\ 1)$$

Of course, the foregoing reaction is an equilibrium reaction, but I have found that polycation is held quite firmly to the montmorillonite.

The basic polymer, instead of being first quaternized, can be reacted directly with an acid clay. Such acid clay can be made by simple treatment of a sodium montmorillonite or other clay-containing exchangeable metallic cation with an aqueous solution of an acid in known manner. In this instance, the final product is the same, i. e., an adduct of a polycation with the clay, Equation 2 below shows diagrammatically the formation of an acid-substituted clay, while Equation 3 below shows the reaction of the acid-substituted clay with a polymer of vinylpyridine. It will be noted that the product is the same as that obtained by Reaction 1, and Reactions 2 and 3 together constitute a base exchange reaction mechanism. Non-quaternized basic polymers are considered herein as polycations.

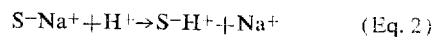
$$S^-Na^+ + H^+ \rightarrow S^-H^+ + Na^+ \quad (Eq.\ 2)$$

$$P + S^-H^+ \rightarrow SPH \quad (Eq.\ 3)$$

Various quaternary polyvinylpyridinium halides, and methods of making same, that can be used in the practice of the present invention are described in U. S. Patent No.

2,487,829. Similarly, reference is made to U. S. Patent No. 2,484,420, for a description of various quaternary salts of resinous linear addition type organic polymers which contain a basic tertiary nitrogen atom wherein the quaternizing agents are alkylsulfates, and alkylarylsulfonates, which can be employed in the practice of the present invention.

In preparing a quaternary polycation I usually use stoichiometrically equivalent quantities of quaternizing agent and basic polymer. However, in some instances it may be desirable to use less of the quaternizing agent leaving part of the basic groups of the molecule available for other reaction.

In most instances the adduct is formed by simply slurrying the finely divided clay or other gel-forming solid having high surface area and base exchange type of reaction in water together with the chosen polycation. The polycation may be completely water-soluble, or its solubility in water may be considerably limited, which is particularly the case with copolymers containing say 50 percent and above of non-basic monomers in the polymer molecule. In the case of such copolymers it may be necessary in some instances, especially those with the smallest percentage of basic groups in the molecule, to intimately admix the polymer with the clay particles in the presence of water as by ball-milling. Another effective method of preparing adducts from copolymers of the type described which are only slightly soluble in water is by a solvent-non-solvent system. Thus, for example, the polymer is dissolved in a suitable organic solvent, the clay is slurried in water, the two materials are brought together in the presence of an added hydrophilic organic solvent such as methanol or ethanol and with vigorous agitation, whereupon the adduct is formed and settles out. Suitable temperatures, concentrations, and times for effecting formation of the adducts will be greatly dependent upon the particular base exchange solid employed and the particular polycation. The most readily reactive materials are easily adducted at essentially room temperature, e. g. 20° C., flocculation of the clay caused by adduct formation beginning immediately on admixture of the clay and polycation in water solution and being completed in a matter of minutes. In other instances it is desirable to increase the temperature substantially and to provide even several hours for sufficient reaction. Those skilled in the art, having been given the benefit of the present disclosure, will readily be able to determine by simple tests suitable conditions for effecting the reaction in any given situation.

The preferred adducts of the invention are those prepared by flocculation from a suspension of finely divided clay (or other suitable solid of the nature described herein) in a liquid medium, the flocculation occurring by virtue of reaction of the suspended solid with added polycation. The liquid is most often water, but organic liquids can be used, as indicated above, in which case it is ordinarily necessary that some water be present to effect reasonably rapid reaction between the base exchange type solid and the polycation. The suspension should contain at least 2 weight percent of the ion exchange solid. With a highly swelling clay in water the solids content should not exceed 6 percent or the material will set up in a gel on adding the polycation. A non-swelling system can contain higher percentages of solid. Ordinarily, however, the suspension should not exceed 30 percent solids. Much less preferably, chosen solid and polycation can be reacted by effecting direct intimate admixture by mechanical means, as by mixing in a kneader or ball-mill, rather than by means of flocculation from a suspension of solid in a liquid; in such direct mechanical intermixing, it is usually desirable to have some water present, or less preferably a non-aqueous liquid, in an amount sufficient to aid the mixing.

Regardless of the preparation method, my products should be used in the form of fine particles, preferably not larger than 100-mesh, i. e., not more than 1 percent retained on a No. 100 U. S. Standard Sieve. Drying of products made by wet methods usually causes formation of lumps, so that a final grinding step is desirable. The finished, isolated product is a non-aggregated finely divided pulverulent reaction product or adduct. In some instances it might be possible to use the adduct in other than finely divided form where the subsequent manufacturing step or steps, e. g. blending the adduct with rubber or plastics on a mill or with oil in grease-making machinery, results in breaking up of adduct particles so that it is ultimately in finely divided form.

The relative proportions of polycation and base exchange solids to be used can be varied over a considerable range. Factors influencing the quantitative interrelationships of the polycation and the base exchange solid will be discussed more thoroughly hereinafter. However, it can be stated here that I generally prefer to employ polycation in an amount that is at least 80 percent of the stoichiometric quantity, the latter value being based on the base exchange capacity of the base exchange solid in milliequivalents per 100 grams and upon the theoretical assumption of one cation group reacting with one base exchange site, there being of course numerous cation groups in a single polymer molecule. In other words, taking the case of the homopolymer of vinylpyridine, the number of milliequivalents of polymer is calculated on the basis of individual pyridine groups, not on the basis of individual polymer molecules. It is a curious fact that in making the products of the present invention the base exchange solid seems in many instances to be able to take up far more than the equivalent quantity of polycation. Thus, I have made satisfactory products employing 200 percent of the stoichiometric quantity of polycation, and such quantities and even more are within the scope of the invention. As pointed out before, the use of copolymers enables the incorporation of a large proportion of organic material in the base exchange solid using only a limited proportion of cationic monomer in making the copolymer. It is apparent that the weight percent organic material in the final product can vary over a great range, but it should preferably be at least 3 weight percent and usually considerably more, for example 10 percent or more, for best results.

As will appear more fully hereinafter, the cationic polymers can be prepared not only by polymerization of monomer or monomers containing a basic group but also by after-treatment of polymers containing reactive groups that are not basic but which can be made basic by such after-treatment. Thus, for example, acrylonitrile can be polymerized to form polyacrylonitrile, which can then be subjected to catalytic reduction whereby part or all of the nitrile groups are reduced to amino groups.

Useful polymeric cations are polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinyl amines may be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolytes are the polymers of products derived by the hydrolysis of amides and imides, such as N-vinylformamide, N-vinylacetamide, N-vinylbenzamide, N-vinyl-N-methylformamide, N-vinyl-N-methylacetamide, N-vinyl-N-methylbenzamide, N-vinylphthalimide, N-vinylsuccimide, N-vinyldiformamide, and N-vinyldiacetamide. Similarly, copolymers of these various amides with other polymerizable monomers may be first prepared and subsequently hydrolyzed to the corresponding vinyl amine derivatives. The polyallylamines and polymethallylamines and copolymers thereof may be prepared by polymerizing acrylonitrile or methacrylonitrile, alone or in the presence of other monomers, and then by hydrogenation converted into amine-containing polymers.

Suitable polycations can be made by polymerization of amides, N-alkyl substituted amides, N-aminoalkyl amides and the corresponding N-alkylaminoalkyl-substituted amides of unsaturated carboxylic acids, the aminoalkylacrylates, the aminoalkylmethacrylates, and the N-alkylsubstituted amino alkyl esters of acrylic or methacrylic acid, fumaric acid, maleic acid, and the like. Suitable polycations can be prepared from the esterification products of acrylic or methacrylic acid or other polymerizable unsaturated mono- or dibasic organic acids with alkylol amines, e. g. ethanol amine, triethanol amine, etc. These polymeric compositions can be the homopolymers or they can be copolymers with other copolymerizable monomers such as ethylene, propylene, isobutylene, styrene, α-methylstyrene, vinyl acetate, vinyl formate, alkyl vinyl ethers, acrylonitrile, methacrylonitrile, vinyl chloride, vinylidene chloride, the alkyl acrylates, the alkyl methacrylates, the alkyl maleates, the alkyl fumarates, and other olefinic monomers copolymerizable therewith. Polymers of this type can be prepared directly by the polymerization of suitable monomers, or by the after-chemical reaction of other polymers.

"Onium" polycations other than those of nitrogen are within the scope of the present invention, for example vinyl polymers containing sulfonium, phosphonium, arsonium, etc. groups. Various methods of making such polymers are known and available. Probably the most convenient method is to react an active halogen-containing polymer, e. g. polyvinylchloroacetate, with thioethers, tert. phosphins, or arsines. By way of example can be mentioned the reaction product of a polymer of vinyl chloroacetate ($CH_2ClCOOCH=CH_2$) with dimethyl thioether (dimethylsulfide, $CH_3SCH_3$), which can be named dimethylcarbo(polyvinyl)-oxymethylsulfonium chloride.

Polycations to be employed in the present invention can be prepared directly by the polymerization or copolymerization of one or more organic monomers with aliphatic unsaturation if at least one of said monomers contains a basic group. However, many types of polycations can be prepared instead by subsequent reactions of polymers and copolymers. For example, polymers containing nitrile groups can be hydrogenated to form amine-containing polymers. Still other types of polycations can be prepared by reacting halogen-containing polymers, for example the polymers or copolymers of vinylchloroacetate, allylchloroacetate, methallylchloroacetate, or vinylchloroethyl ether, with amines to form amine salt radicals and quaternary ammonium radicals whereby what would otherwise be an insoluble polymer is converted to a water-soluble cationic polymer. It is also possible to subject a polymer to a plurality of reactions leading to the formation of polycation. For example, polystyrene can be chloromethylated by known procedure, and the resulting chloromethylated polystyrene then reacted with ammonia or amines, e. g. diethylamine, pyridine, etc., to form a polymer containing amine groups. Those skilled in the art will understand how to effect desired aftertreatment of polymers to provide polycations having the desired extent of basicity and water-solubility. Homopolymers and copolymers of unsaturated carboxylic acid amides such as acrylamide, methacrylamide, crotonamide, their N-substituted derivatives, and the like, as made by many polymerization procedures are found to be cationic as evidenced by ability to flocculate clay from its suspension in water; such cationic character may be due at least partly to imide or other groups formed by chemical modification of the amide or substituted amide groups occurring during or after polymerization.

Polymers and copolymers are identified herein in terms of monomeric constituents. However, it is to be understood that the names so applied refer to the molecular structure of the polymer and are not limited to the polymers prepared by the polymerization of the specified monomers. In many instances polymers can be prepared from other monomers and converted by subsequent chemical reaction to the desired cationic polymer as described herein.

Thus, the various polycations of the types described herein can be termed "ethylenic" polymers, i. e., polymers prepared by "vinyl polymerization," that is, prepared by polymerization of at least one monoolefinic compound through aliphatic unsaturation, said polymers having numerous side chains distributed along a substantially linear continuous carbon atom chain. Moderate branching and cross-linking of this chain are permissible. The side chains can be all of one type or can be of different types so long as some contain basic groups, e. g. heterocyclic amino nitrogen groups, amino alkyl groups, etc., the number of such groups and the relative proportions of hydrophilic and hydrophobic groups being such as to provide a polymeric compound having a substantially large number of ionizable radicals giving rise to a cationic polymer molecule by electrolytic dissociation in water. The length of the said continuous carbon chain is great, and is preferably such as to provide polymers having a weight average molecular weight of at least 2000. The continuous carbon chain is not easily broken because the carbon atoms therein enter into further reaction only with difficulty.

The polycations employed in the present invention may be water-soluble to the extent that they form apparently true homogeneous solutions or mixtures with water, or they may be more difficultly soluble polymers which expand in the presence of water and dissolve at least to some extent, and even included are some which are apparently insoluble in distilled water but which are capable of entering into base exchange reaction with the clay or other base exchange solid to be treated with such polymers. It will be understood of course that a polycation such as polyvinylpyridine or other amine-containing polymer in the free amine form, while it may not per se be appreciably soluble in distilled water, is included within the scope of the materials to be used inasmuch as its quaternized form is soluble and/or its free amine form is reactable directly by base exchange with a material such as acid-substituted montmorillonite.

The products of the present invention have many uses. For example, bentonite films have long been known. Films made from bentonite-polycation adducts are much more stable towards water. The properties of clays are improved for many purposes by virtue of the changed character of the surface. Use of the products of this invention in various organic liquids and solids is claimed in the copending application of Earl W. Gluesenkamp entitled "Improved Organic Materials," Serial No. 348,817, filed of even date herewith.

Inasmuch as various procedures for effecting polymerization of ethylenically unsaturated monomers are so well-known in the art, it is not deemed necessary to go into much detail here. It will suffice to say that it is possible to make polycations suitable for the practice of the present invention by all of the various known polymerization techniques. These include mass or bulk polymerization, wherein the reaction mixture is free from added solvent or other reaction medium and consists solely of monomers, resultant polymers and catalyst, if any. Alternatively, the polymerization can be carried out in water solution in the case of water-soluble monomers, in organic solvents in which either monomer or polymer or both are soluble, or can be effected by the suspension or emulsion polymerization techniques. For suspension polymerization a reaction medium such as water is used together with a small amount of a suspending agent, for example water-soluble vinyl acetate/maleic anhydride copolymer derivatives, carboxymethylcellulose, etc., to give a suspension of particles of initial monomeric mixture which particles grow in size as the polymerization proceeds yet are not of such small size as to result in a permanently stable latex. This is called "pearl" polymerization where the particles are of quite large size. Emulsion polymerization can be effected by employing water, a sufficient amount of emulsifying agent, for example a water-soluble salt of a sulfonated long chain alkyl aromatic compound or a surface active condensation product of ethylene oxide with long chain aliphatic alcohols or mercaptans, etc., along with vigorous agitation whereby an emulsion of the reactants in water is formed and the product is obtained in the form of a latex. Such latex can then be coagulated if desired by known methods and the polymer separated from the water, or it can be subjected to quaternizing treatment with water-soluble quaternizing agents without direct separation of polymer from the aqueous medium.

Suitable catalysts for polymerization include the "per" compounds and the "azo" compounds. Furthermore many polymerizations can be effected in the absence of any added catalysts, or can be promoted by ultraviolet irradiation. The peroxide-type and the azo-type polymerization catalysts are of the free-radical promoting type. Peroxide catalysts can be inorganic or organic, the latter having the general formula R'OOR'' wherein R' is an organic radical and R'' is an organic radical or hydrogen. These compounds are broadly termed "peroxides" and in a more specific sense are hydroperoxides wherein R'' is hydrogen. By way of example of "per" compounds can be mentioned benzoyl peroxide, di-tert.-butyl peroxide, tert.-butyl hydroperoxide, cumene hydroperoxide, hydrogen peroxide, potassium persulfate, perborates, etc. Azo-type polymerization catalysts are characterized by the presence in the molecule of the group —N=N—; the dangling valences can be attached to a wide variety of organic radicals with each one however being preferably attached to a tertiary carbon atom. By way of example can be mentioned $\alpha,\alpha'$-azodiisobutyronitrile, diazonium halides, etc.

The following examples set forth certain polymer preparations and the formation of certain clay-polycation adducts, to illustrate some of the preferred methods for practicing the invention. It will be understood, of course, that numerous variations in the materials and proportions and procedures can be made without departing from the invention. Parts are by weight unless otherwise stated.

EXAMPLE 1

Adducts of a Wyoming bentonite high in montmorillonite content with poly-$\beta$-dimethylaminoethyl methacrylate hydroacetate were made using varying ratios of one to the other. One suitable method for preparing the polycation is as follows:

10 parts dimethylaminoethyl methacrylate
3.86 parts glacial acetic acid and
0.2 part potassium persulfate in
90 parts of water Hold overnight at 70° C. and then dilute with water. Any other suitable method of making the polycation can be employed, including polymerizing the dimethylaminoethyl methacrylate as such and then reacting the polymer with acetic acid.

In one preparation, 0.665 part of the polycation, $\beta$-dimethylaminoethyl polymethacrylate hydroacetate, was dissolved in 650 parts of water. To this solution was added 1 part Wyoming bentonite and the mixture stirred until the bentonite was thoroughly wetted. The water was removed by evacuation at room temperature, placed in a vacuum dessicator over calcium sulfate, and finally dehydrated in a vacuum dessicator over $P_2O_5$.

In like manner, adducts of the same bentonite with the same poly-$\beta$-dimethylaminoethyl methacrylate were prepared containing respectively 0.035, 0.075 and 0.202 weight polycation per weight of bentonite.

Samples of each of the adducts were sealed into glass capillary tubes, X-ray diffraction patterns obtained by standard procedures, and the characteristics $c$-axis spacing of montmorillonite was measured with the following results:

$c$—axis of montmorillonite treated with polycation

| Polymer Per Weight Clay | Distance, Angstrom units |
| --- | --- |
| 0 | 9.7–10.1 |
| 0.035 | 11.8 |
| 0.075 | 11.4 |
| 0.202 | 12.8 |
| 0.665 | 14.4 |

These results demonstrate that the polycation is adsorbed on the faces of the montmorillonite layers, presumably by means of cationic exchange. The $c$-axis spacing increases with increasing proportions of the polycation. However, none of the values is greater than that of the untreated clay by more than 4.7 Angstrom units. A value of 13.6 Angstrom units would be a separation of 3.9 Angstrom units which is the Van der Waals thickness of a methylene group. Thus, it is believed likely that the hydrocarbon portion of the polycation lies essentially parallel to the clay surfaces, held there by Van der Waals forces. The gradual increase in layer separation with greatly increasing proportions of polycation may be interpreted as indicating that overlapping of the polycation molecules is occurring to a gradually increasing extent. However, as will be discussed in more detail hereinafter the amount of overlapping must be small and this is in marked contrast to adducts of montmorillonite with simple long chain amines in quantities that cover more than 50 percent of a single face of montmorillonite, which result in a layer separation equal to two methylene group thicknesses. It is believed that there is a fundamental difference in the adducts of montmorillonite with polycations made in accordance with this invention, and the adducts of montmorillonite with comparatively low molecular weight amines in that the polycations have numerous basic groups scattered along the carbon chain skeleton, some of which can become associated with base exchange sites on the face of one plate while others in the same molecule can become associated with base exchange sites on the face of an adjacent plate, preventing the build-up of two complete organic layers, one on each face of adjacent plates which together would result in the layer separation equivalent to the thickness of two methylene groups.

EXAMPLE 2

Polyvinylbutylpyridonium bromide was prepared as follows:

A mixture of 140 parts of freshly distilled 2-vinylpyridine, 2800 parts of toluene and 5.6 parts benzoyl peroxide was deaerated by bubbling nitrogen through for 15 minutes, and the capped container placed in a water bath at 43° C. for 3 days. The solid polymer was filtered, washed with toluene, dissolved in pyridine and reprecipitated from toluene. A mixture of 20 parts of this polyvinylpyridine, 340 parts of nitrobenzene and 77 parts of n-butyl bromide was held at 55° C. for 4 days and the excess nitrobenzene and butyl bromide were removed by evaporation at room temperature. The polyvinyl N-n-butylpyridonium bromide was dissolved in ethanol, reprecipitated from dioxane, and filtered.

Two parts by weight bentonite clay, 1 part by weight of the polyvinylbutylpyridonium bromide and 300 parts of water were intimately admixed and then slowly evaporated to dryness on a steam bath. This resulted in the formation of a thin film which was more resistant to water than was the non-treated bentonite film formed in the same manner.

EXAMPLE 3

In this example a sodium bentonite from Wyoming, having a cation exchange capacity of 89 milliequivalents per 100 grams of clay (oven-dry) was used. The clay as received and before oven drying contained 7.8 percent water and about 10 percent non-montmorillonitic minerals. If the exchange capacity of 89 is corrected for water and for non-clay minerals, the clay would have an exchange capacity of about 100 milliequivalents per 100 grams of pure clay. The particle size was 200 mesh or less.

Poly-2-methyl-5-vinylpyridine was prepared by mass polymerizing freshly distilled inhibitor-free 2-methyl-5-vinylpyridine at room temperature for 60 days. No catalyst was added, and no attempt to exclude atmospheric oxygen was made other than corking of the polymerization vessel. A clear amber polymer with a specific viscosity of 0.3 (0.1 percent solution in dimethylformamide) was obtained.

To a suspension of 148 parts of the bentonite in 3000 parts of water was added an aqueous solution containing 100 milliequivalents each of the poly-2-methyl-5-vinylpyridine and hydrochloric acid. The clay was immediately and completely flocculated. The material was filtered off, washed to remove soluble salt (NaCl) and dried and ground.

The product was difficultly wetted by water, easily wetted by polar and non-polar organic liquids, and increased in volume about two-fold in nitrobenzene. It was easily dispersed in synthetic resins.

EXAMPLE 4

A copolymer was prepared by emulsion polymerization of a monomeric mixture consisting of 50 parts by weight styrene and 50 parts by weight 2-methyl-5-vinylpyridine, using a 2.5/1.0 water/monomer weight ratio, 0.1 percent potassium persulfate as catalyst, 4.5 percent Rubber Reserve Soap as emulsifier, and a 1.5-hour polymerization period. The polymer was isolated from the emulsion by freezing, thawing, filtering and washing. Specific viscosity of the polymer was 0.09 (0.1 percent solution in dimethylformamide).

The hydrochloride of this styrene/methyl vinylpyridine copolymer was prepared by reacting the copolymer with the equivalent amount of hydrochloric acid in aqueous solution. The resulting aqueous solution of the hydrochloride was thick and stringy.

The hydrochloride of the copolymer, in the amount of 23.8 parts, was reacted with a suspension of 118 parts of the sodium bentonite described above in Example 3, suspended in 3000 parts water, producing immediate flocculation. Hydrophobicity, organophilicity and swelling in nitrobenzene were all more marked in comparison with the product of Example 3.

EXAMPLE 5

Examples 3 and 4 can be repeated, except using acetic acid in place of hydrochloric acid, and substantially the same results will be obtained.

EXAMPLE 6

The N-methyl p-toluenesulfonate quaternary salt of the 50/50 styrene/methylvinylpyridine copolymer described in Example 4 was prepared by reaction of the polymer (23.8 parts) with the equivalent amount (18.6 parts) of methyl paratoluenesulfonate at reflux in ethanol for 24 hours. Both the polymer and its quaternary salt were soluble in ethanol. The ethanol solution of the quaternary was diluted five-fold with water without formation of a precipitate, indicating complete reaction. This water/ethanol solution was reacted with 118 parts of the sodium bentonite described in Example 3 to give thorough flocculation. The clay-polymer adduct assayed 16.6 weight percent carbon.

This polycation-clay adduct when coprecipitated with GR-S latex exhibited good reinforcing action on the synthetic rubber.

EXAMPLE 7

The N-butyl bromide quaternary salt of the 50/50 styrene/methylvinylpyridine copolymer described in Example 4 was successfully prepared in dioxane and in ethanol solutions. The quaternary could not be prepared satisfactorily in benzene solution. Aqueous solutions of the stoichiometric quantity of the N-butyl bromide quaternary with Wyoming bentonite gave good flocculation of the clay to produce an adduct.

EXAMPLE 8

A 70/30 styrene/methyl vinylpyridine copolymer was prepared by an emulsion polymerization identical with that used for the 50/50 copolymer except that only 0.05 percent potassium persulfate was used.

Attempts to prepare the hydrochloride or acetate of this polymer in aqueous solution were unsuccessful. Milky suspensions containing free acid and undispersed polymer were obtained.

Preparation of the hydrochloride and reaction with bentonite was effected by ball-milling the polymer in the stoichiometric amount of dilute hydrochloric acid until a smooth slurry was obtained. The requisite amount of bentonite suspension was then added, and ball-milling continued. The resulting polymer-clay slurry appeared completely flocculated. Some polymer could be extracted with benzene from the dried product indicating incomplete reaction.

EXAMPLE 9

Another method of preparing the hydrochloride and reacting it with clay produced a more completely reacted product than in Example 8, since no free polymer could be extracted. The copolymer described in Example 8 was dissolved in benzene containing the equivalent amount of concentrated hydrochloric acid. No difficulties in dissolving the acid or polymer in benzene were encountered. After solution was complete, ethanol was added in portions with shaking until the point of incipient precipitation was reached. The total volume of alcohol added was equivalent to the original solution volume. The required amount of dry bentonite was slurried in the solution in a Waring Blendor. No reaction was noted. A three-fold excess of water was added slowly with violent agitation. The mixture thickened progressively until about ⅙ of the water had been added, and thinned with further addition. The final mixture was a smooth, thick, white cream. After the reaction mixture stood for 30 minutes, two layers were present: a lower clear aqueous layer which was removed, and a stiff white paste which oozed water when kneaded. The mass was dried at room temperature with intermittent kneading and decantation of expressed water, until no odor of benzene could be detected. The now-friable mass was dispersed in ethanol in a Waring Blendor, and allowed to settle. The moist sediment was added to an equal volume of benzene. Some swelling was noted. The slurry was dried at room temperature, to form a chalky white mass with a brown, translucent horny skin on the surface. No polymer could be extracted from either portion.

EXAMPLE 10

A preparation similar to that of Example 9 was made using methyl ethyl ketone as the organic liquid and omitting the ethanol dilution. Thickening during addition of water was much reduced and the final mixture was a thin suspension which did not completely settle out on standing. Flocculation was induced by boiling off the bulk of the methyl ethyl ketone, and the product isolated by conventional procedures. No free polymer could be extracted from the product with benzene.

EXAMPLE 11

By the same procedure used in Example 10, the N-methyl paratoluenesulfonate quatenary salt of the 70/30 styrene/methylvinylpyridine copolymer was prepared in methyl ethyl ketone. No free polymer could be extracted from the product.

EXAMPLE 12

A 90/10 styrene/2-methyl-5-vinylpyridine copolymer was prepared by emulsion polymerization using the same recipe used for the 70/30 styrene/methylvinylpyridine copolymer described in Example 8. Aqueous solutions of the hydrochloride or hydroacetate could not be prepared satisfactorily.

Sodium bentonite in the amount of 11.8 parts was slurried in a solution containing 11.9 parts of the 90/10 styrene/methylvinylpyridine copolymer, 1.86 parts methyl paratoluenesulfonate, and 45 parts benzene. The slurry was homogenized with 500 parts water in a Waring Blendor to give a stiff white paste which oozed water on kneading. The paste dried at room temperature to a friable mass that swelled in benzene in methyl ethyl ketone, and in toluene.

EXAMPLE 13

The hydroacetate of the 90/10 styrene/methylvinylpyridine copolymer described in Example 12 was prepared and reacted with clay by the benzene/ethanol system described in Example 9. The result was a completely reacted clay-polymer adduct.

EXAMPLE 14

N - methyl poly - 2 - methyl - 5 - vinylpyridinium p-toluenesulfonate was prepared by reacting equimolar amounts of PMVP and methyl p-toluenesulfonate in dioxane solution. After about 30 minutes at room temperature, the polymer quaternary salt precipitated. The dioxane was decanted, and the precipitate dissolved in water. The aqueous solution was reacted equimolecularly with a bentonite suspension to give thorough flocculation with resultant separation of polycation-bentonite adduct.

X-ray diffraction can be used to determine the c-axis spacing of montmorillonites. For a dry bentonite this spacing is 9.6 Angstrom units. If the amount of adsorbed water is plotted against c-axis spacing, a continuous curve with inflections corresponding to integral layers of water is obtained.

Liquids other than water are also adsorbed between clay plates, notably polyhydroxy compounds like ethylene glycol, but here the continuous curve is replaced by a sharp equilibrium spacing corresponding to an integral layer of the liquid. This increased spacing corresponds closely to the Van der Waals dimensions of the adsorbed molecule, or to mulples thereof. For example, ethylene glycol in equilibrium with bentonite gives a c-axis spacing of 17.1 Angstrom units. Subtracting 9.6 Angstrom units, the basal spacing, we get 7.5 Angstrom units, corresponding to twice the Van der Waals thickness of the glycol molecule.

Replacement of the sodium ion by organic cations gives similar results. Propylammonium bentonite gives a c-axis spacing of 13.5 Angstrom units, corresponding to a separation of 3.9 Angstrom units, or the Van der Waals thickness of a methylene group. This would indicate that the hydrocarbon portion of the exchange cation lies essentially parallel to the clay surfaces, held there by Van der Walls forces. That this is true is indicated by the fact that increasing the chain length of the hydrocarbon up to a maximum of 10 carbon atoms, does not affect the plate separation.

For a 12-carbon chain, however, the separation jumps to 7.8 Angstrom units, or a double layer of methylene groups. This indicates a relation between the area of the parallel hydrocarbon and the total clay surface. The area per cation exchange site of the clay surface was computed and found to be 165 square Angstrom units for a clay with exchange capacity of 100 milliequivalents per 100 grams. Hydrocarbons with 10 or less carbon atoms would have areas less than half this value, so two clay surfaces, each less than 50 percent covered by hydrocarbon, can approach each other to within the distance determined by a single hydrocarbon layer.

A hydrocarbon with 12 or more carbon atoms would have an area covering more than 50 percent of the clay area, and it would be impossible for two clay surfaces so covered to approach closer than a double thickness of hydrocarbon.

The behavior of polycationic materials on clay exhibit anomalies from the foregoing behavior. X-ray diffraction data on a number of adducts of clay with polycations are set forth in detail in the table below. Although the polymers used range from 53 square Angstrom units (32 percent clay surface coverage) in area per cation unit for polymethylvinylpyridine to 461 square Angstrom units (280 percent clay surface coverage) for the 90/10 styrene/methylvinylpyridine copolymer, the plate separations of all of these products clustered about the value of 4 Angstrom units or a single organic layer. (The separation of 7.7 Angstrom units in one instance is as yet unexplained.)

*X-ray diffraction data for polycation-bentonite derivatives*

| Ex. No. | Polycation | C-Axis Spacing, A. | Separation, A. | No. of Organic Layers | Width | Peak Intensity | Sq. A. Estimated Area Per Organic Unit | Estimated Percent Clay Area Covered* |
|---|---|---|---|---|---|---|---|---|
| | None | 9.6 | none | none | medium | high | | 0 |
| | PMVP | 14.3 | 4.7 | 1+ | broad | medium | 53 | 32 |
| 3 | PMVP | 13.6 | 4.0 | 1 | do | do | 53 | 32 |
| (a) | MPVP (excess) | 13.0 | 3.4 | 1− | do | do | 53 | 32 |
| (b) | N-Me PMVP | 14.7 | 5.1 | 1+ | do | do | 59 | 36 |
| 14 | 50/50 S/MVP | 14.7 | 5.1 | 1+ | do | do | 98 | 59 |
| 4 | 50/50 S/MVP | 13.0 | 3.4 | 1− | do | low | 98 | 59 |
| (c) | N-Me 50/50 S/MVP | 13.8 | 4.2 | 1+ | do | medium | 104 | 63 |
| 6 | 70/30 S/MVP | 13.2 | 3.6 | 1 | v. broad | v. low | 159 | 97 |
| (d) | N-Me 70/30 S/MVP | 17.3 | 7.7 | 2 | do | do | 165 | 100 |
| 11 | 90/10 S/MVP | 13.4 | 3.8 | 1 | do | do | 461 | 280 |
| 13 | | | | | | | | |

*Based on 165 square A. of clay surface per exchange site.
PMVP=Poly-2-methyl-5-vinylpyridine.
N-Me PMVP=methyl-p-toluene sulfonate quaternary of PMVP.
S/MVP=Styrene/2-methyl-5-vinylpyridine copolymer.
(a) Preparation similar to Example 3.
(b) Preparation similar to Example 3, but 200% of the equivalent amount based on clay exchange capacity of polymethylvinylpyridine.
(c) Preparation similar to Example 4.
(d) Preparation similar to Example 9, but acetic acid.

Having obtained the information described herein, several conjectures to explain the behavior can be advanced. It is to be understood, however, that the invention is not dependent on any particular theory suggested here. First, a polycation is not restricted to attachment of all its ionic sites to a single clay surface, but can effectively bind two clay surfaces together to give a semi-cross-linked system. This system is less free to swell in non-polar organic liquids than clays treated with simple amines. Second the orderliness of a reaction between a polycation and a clay surface may be much less than for a simple cation. Mutual interference of polymer chains in their approach to the clay surface, and premature approximation of two clay surfaces before they are completely saturated by polycation chains would prevent an orderly surface coverage and a high degree of perfection (indicated by the width of the $c$-axis spacing line in an X-ray diffraction pattern). Third, while the exchange sites are not believed to be fixed in a rigid array on the clay surface, Pauling's principle of micro-neutrality would demand that the cation approach as nearly as possible the source of the negative charge. Since the distance between charges on a polycation are more or less predetermined, if this distance is not a good match for the separation between ionic sites on the clay, good approximation of a polycation to the clay surface is made unlikely.

Evidence for the lack of order can be drawn from the shapes of the $c$-axis spacing peaks recorded by X-ray diffraction spectrometer. For polycations on bentonites, these peaks are broad, indicating a wide distribution of plate separations, and of low intensity, indicating relatively few plate packets of a given constant separation.

The benzidine color reaction also gives evidence for disorder in these systems. Benzidine, and other aromatic amines, form intensely colored complexes with montmorillonite surfaces. The intensity of color when organobentonites are treated with benzidine would be a measure of the amount of clay surface not covered by organic material. Simple alkylammonium bentonites give only faint colors when the alkyl radical covers essentially all of the surface. However, all of the polycationbentonites, even those where the computed area per ion for the polymer is more than enough to cover the clay surface completely, give relatively intense colors with benzidine. This can be taken to mean that while a stable polymer-clay complex from which free polymer cannot be extracted can be prepared by reacting the clay with a polycation, orderly and complete coverage of the clay surfaces is not attained. This means that there is still some surface available on the clay which for many uses will be found very desirable inasmuch as a clay having a high organic content is available and yet still having limited clay surface available for other purposes.

From the foregoing discussion it will be seen, first that polycations have been shown to be capable of entering into the spacing between montmorillonite layers to a very important and substantial extent. It can be further seen that the proportion of polycation actually going between the clay layers and separating same is limited to an approximation of a mono-molecular layer. It follows then that there are of necessity many "tails" of cationic polymer "sticking out" from between the clay platelet in a free condition, i. e., not bound by chemical union with the clay particles. These portions of the polymer molecules, part of which are molecules between clay layers and bound thereto while the remainder is not, contain numerous cation units which therefore are available for other chemical reaction. Thus, there is provided a clay material containing a high content of organic matter and containing a large number of reactive amine groups still available for other reaction. It is apparent that this type of material is fundamentally different from adducts of clays with simple amines.

EXAMPLE 15

Acrylamide (20 grams) was dissolved in 80 grams dioxane, and 0.05 gram benzoyl peroxide was added. This mixture was polymerized in a pressure bottle with gentle tumbling at 63° C. for 48 hours, resulting in a solid white reaction mixture. The solid was digested in excess acetone, filtered and dried in a vacuum oven at 80 to 90° C. The yield of polymer was essentially quantitative. The polymer was soluble in water, and its specific viscosity (0.4 percent in water) was 0.27.

This polyacrylamide (its chemical constitution and the extent of modification, if any, of amide groups occurring during polymerization were not determined) was tested to determine its ability to flocculate kaolinite from a suspension of 4 grams kaolinite in 1 liter of water. The polyacrylamide in a concentration within the range of 100 to $1000 \times 10^{-6}$ equivalents per liter was sufficient to effect the flocculation.

A portion of the same polyacrylamide when reacted with bentonite (10 parts of polyacrylamide/90 parts bentonite), resulted in an adduct having a $c$-axis spacing of 14.7 Angstrom units as determined by X-ray diffraction measurements.

EXAMPLE 16

One gram of a copolymer of 95 parts acrylonitrile with 5 parts vinylacetate was subjected to hydrolysis in 10 ml. concentrated sulfuric acid and 2 ml. water by standing at room temperature overnight. The resulting material was dissolved in about 40 ml. of water, then poured into an excess of ethanol in a Waring Blendor. The alcohol was decanted from the gummy precipitate, more alcohol added and the polymer became hard. This material was filtered and dried in a vacuum oven at 50° C.

The thus-modified polymer was cationic as demonstrated by its ability, in a concentration of $200 \times 10^{-6}$ equivalents per liter, to flocculate a suspension of 4 grams kaolinite in 1 liter of water. As reference points, it can be noted that aluminum ion flocculates the same suspension in a concentration of $500 \times 10^{-6}$ equivalents aluminum ion per liter, and an extremely strong polycation, such as polyvinylpyridine hydrochloride, is effective in a concentration of $10 \times 10^{-6}$ equivalents per liter to flocculate the kaolinite suspension.

EXAMPLE 17

A total of 214.8 milliequivalents of polymethylvinylpyridine hydrochloride and octadecylamine hydroacetate in a molar ratio of 4:1, was dissolved in water and added to a 2 percent suspension of 214.8 milliquevalents of the sodium bentonite employed in the foregoing examples. Immediate and thorough fluocculation occurred. The slurry was separated on bag filter and reslurried and refiltered until effluent was chloride-free. The cake was then slurried and filtered twice from ethanol and let dry at room temperature.

The swelling properties of this product in organic liquids was intermediate between similar products made exclusively with polymethylvinylpyridine and exclusively with octadecylamine.

EXAMPLE 18

Following are further examples of polycations that are suitable for reacting with gel-forming oxides having high surface area and/or base exchange reactivity in accordance with the present invention.

*Methacrylic acid (35%)/dimethylaminoethyl methacrylate (65%) copolymers.*—Six and one-half parts of dimethylaminoethyl methacrylate and 3.5 parts of methacrylic acid were dissolved in 90 parts of water and 0.02 part of potassium persulfate was added as a catalyst. The solution was heated at 60° C. overnight and then diluted to a 2 percent solution for use.

*Styrene/maleic acid-β-dimethylaminoethyl half-ester.*—Styrene/maleic anhydride copolymer was warmed with an excess of β-dimethylaminoethanol. A spongy mass formed from which excess alcohol was removed by squeezing and by washing with absolute ether. Two parts of air-dried polymer was dissolved in 100 parts of water.

*Polyvinylpyridine/acrylonitrile hydrosulfate.*—A copolymer of 70 percent vinylpyridine and 30 percent acrylonitrile was prepared by an emulsion system in which the monomer mixture was fed into an aqueous solution of soap stirred and heated at reflux temperature. This polymer was dissolved in a 5 percent sulfuric acid solution in such amounts that the sulfuric acid present was equivalent to the vinylpyridine present. This aqueous solution may be used directly with the applications described.

*Polyvinylpyridine/acrylonitrile methyl-paratoluenesulfonate quaternary.*—The 70 percent 2-vinylpyridine/30 percent acrylonitrile copolymer described in the preceding preparation, was dissolved to make a 5 percent solution in dimethylformamide. A stoichiometric amount of methyl-paratoluenesulfonate was added and the solution was heated at 60° C. for 5 hours. Essentially complete conversion to a quaternary was obtained. The polymer was isolated by pouring into acetone. This polymer is readily soluble in water.

*Polyvinyl chloroacetate pyridinium salt.*—Polyvinyl chloroacetate was prepared by a mass polymerization technique at 60° C. using 0.02 percent benzoyl peroxide as the catalyst. The polymer had a specific viscosity (in 0.1 percent dimethylformamide solution) of 0.30. Five parts of this polymer was dissolved in pyridine. After 2 hours' stirring the polymer precipitated as the pyridinium salt of the polyvinyl chloroacetate. The slurry was heated at 80° C. for 2 hours to complete the reaction. The polymer was filtered off and dried and was found to be soluble in water. Chemical analyses indicate the essentially complete conversion of the chloroacetate groups to quaternaries.

*Polyacrylamide.*—Ten parts of acrylamide and 0.05 part of potassium persulfate were dissolved in 90 ml. of water and heated in an oven at 60° C. for 5 hours. Because of some hydrolysis the polymer contained some ammonium salt and imide groups in addition to acrylamide units. The solution was diluted with 400 ml. of water for use.

*Polyvinyl chloroacetate trimethylamine salt.*—A 5-gram sample of polyvinyl chloroacetate, prepared as in the preceding examples, was dissolved in 100 cc. of 25 percent trimethylamine aqueous solution. An aqueous solution of the trimethylamine salt of polyvinyl chloroacetate was thus obtained.

*Polyvinyl 2-chloroethyl ether.*—Vinyl 2-chloroethyl ether was polymerized in liquid propane containing crushed solid $CO_2$ using boron trifluoride catalyst. The polymer was isolated and purified by precipitation and dried (specific viscosity of one percent benzene solution equals 1.00). The polymer was dissolved in dimethylformamide and trimethylamine added and the solution heated. The resulting water-soluble polymer, containing quaternary ammonium salt groups as part of the polymer molecule, was isolated by precipitation in ether.

*Acrylamide/acrylonitrile copolymer.*—Ninety parts of acrylamide, 10 parts of acrylonitrile, 0.2 part of potassium persulfate and 0.1 part of sodium bisulfite were dissolved in one liter of 50 percent methyl alcohol and heated for 4 days at 60° C. The resultant precipitated polymer was then filtered, washed with methanol and dried. Two parts of this material was dissolved in 98 ml. of water.

While the invention has been described herein with particular reference to various preferred embodiments thereof, it will be appreciated that variations from the details given herein can be effected without departing from the invention in its broadest aspects.

I claim:

1. A finely divided reaction product of a high surface area hydrophilic substance possessing ion exchange properties with at least 3 weight percent of a cationic synthetic high polymer containing a substantially linear molecular chain derived by the polymerization of at least one monoolefinic compound through aliphatic unsaturation.

2. A reaction product of a montmorillonite-containing mineral with at least 3 weight percent of a cationic synthetic high polymer containing a substantially linear molecular chain derived by the polymerization of at least one monoolefinic compound through aliphatic unsaturation.

3. A reaction product of a montmorillonite-containing mineral with a cationic synthetic high polymer containing a substantially linear molecular chain derived by the polymerization of at least one monoolefinic compound through aliphatic unsaturation, said cationic polymer being present in an amount which is at least 3 weight percent and is at least 80 percent of the stoichiometric quantity based on the base exchange capacity of said mineral and the equivalent basic units in said high polymer.

4. A hydrophobic material prepared by base exchange reaction between a substantially pure base exchange clay mineral and an amount which is at least 3 weight percent and is at least 80 percent of the stoichiometric quantity, based on one vinylpyridine group per base exchange site, of a high polymer containing at least 5 weight percent vinylpyridine in the polymer molecule.

5. A hydrophobic material prepared by base exchange reaction between a substantially pure base exchange clay mineral and at least 80 percent of the stoichiometric quantity, based on one amino group per base exchange site, of a high polymer containing at least 5 weight percent of an aminoalkyl methacrylate in the polymer molecule.

6. A hydrophobic material prepared by base exchange reaction between a substantially pure base exchange clay mineral and at least 80 percent of the stoichiometric quantity, based on one amino group per base exchange site, of a high polymer containing at least 5 weight percent dimethyl-β-aminoethyl methacrylate in the polymer molecule.

7. A process which comprises reacting, in the presence of water, a high surface area hydrophilic base exchange solid with at least 10 weight percent of a quaternized synthetic high polymer containing recurring amino nitrogen groups in the molecule and a substantially linear molecular chain derived by the polymerization of at least one monoolefinic compound through aliphatic unsaturation.

8. A process which comprises effecting a base exchange reaction, in the presence of water, of an alkali bentonite mineral with an amount which is at least 3 weight percent and is at least 80 percent of the stoichiometric quantity, based on one vinylpyridine group per base exchange site, of a quaternized high copolymer containing between 5 and 50 weight percent vinylpyridine in the polymer molecule.

9. A hydrophobic material prepared by base exchange reaction between a montmorillonite-containing mineral and an amount which is at least 3 weight percent and is at least 80 percent of the stoichiometric quantity, based on one vinylpyridine group per base exchange site, of a high molecular weight copolymer of from 5 to 50 weight percent of a vinylpyridine and from 95 to 50 weight percent of a non-basic ethylenically unsaturated comonomer.

10. A material according to claim 9 wherein said comonomer is styrene.

11. A reaction product according to claim 1 wherein the molecular weight of said polymer is at least 10,000.

12. A reaction product according to claim 3 wherein the molecular weight of said polymer is at least 10,000.

13. A process according to claim 7 wherein said polymer is quaternized with an acid.

14. A process according to claim 7 wherein said polymer is quaternized with an alkyl halide.

15. A process according to claim 7 wherein said polymer is quaternized with an ester of an aryl sulfonic acid.

16. A hydrophobic reaction product of a bentonite having high base exchange capacity with an amount which is at least 3 weight percent and is at least 80 percent of the stoichiometric quantity, based on one vinylpyridine group per base exchange site, of a high molecular weight copolymer of 10 weight percent 2-methyl-5-vinylpyridine and 90 weight percent styrene.

17. A reaction product of a substantially pure base-exchange clay mineral with at least 3 weight percent of a cationic synthetic high polymer containing a substantially linear molecular chain derived by the polymerization of at least one monoolefinic compound through aliphatic unsaturation.

18. A reaction product of a high surface area hydrophilic substance possessing ion exchange properties and free from non-ion exchange material with an amount, which is at least 3 weight percent and sufficient to decrease the hydrophilic nature of said substance, of a cationic synthetic high polymer containing a substantially linear molecular chain derived by the polymerization of at least one monoolefinic compound through aliphatic unsaturation.

19. A reaction product obtained by flocculating from suspension in an aqueous liquid a high surface area hydrophilic base exchange solid by reaction therewith of a cationic synthetic high polymer containing a substantially linear molecular chain derived by the polymerization of at least one monoolefinic compound through aliphatic unsaturation, isolating and drying resulting flocculated reaction product of said solid and said cationic high polymer, and grinding said dried reaction product to a fineness at least as small as 100-mesh.

References Cited in the file of this patent
UNITED STATES PATENTS

| | | |
|---|---|---|
| 2,129,694 | Izard | Sept. 13, 1938 |
| 2,563,897 | Wilson et al. | Aug. 14, 1951 |
| 2,625,529 | Hedrick | Jan. 13, 1953 |
| 2,650,200 | Iler et al. | Aug. 25, 1953 |
| 2,656,339 | Padbury | Oct. 20, 1953 |
| 2,700,029 | Cassidy | Jan. 18, 1955 |

UNITED STATES PATENT OFFICE

CERTIFICATE OF CORRECTION

Patent No. 2,795,567 June 11, 1957

Robert A. Ruehrwein

It is hereby certified that error appears in the printed specification of the above numbered patent requiring correction and that the said Letters Patent should read as corrected below.

Column 13, line 44, after "dry" insert -- sodium --; column 14, line 4, for "mulples" read -- multiples --.

Signed and sealed this 22nd day of October 1957.

(SEAL)
Attest:

KARL H. AXLINE
Attesting Officer

ROBERT C. WATSON
Commissioner of Patents